United States Patent [19]
Slater

[11] Patent Number: 5,678,872
[45] Date of Patent: Oct. 21, 1997

[54] CONCEALABLE VEHICLE BUMPER STEP

[75] Inventor: Robert E. Slater, Dearborn, Mich.

[73] Assignee: Ford Global Technologies, Inc., Dearborn, Mich.

[21] Appl. No.: 630,105

[22] Filed: Apr. 8, 1996

[51] Int. Cl.$^6$ ........................................ B60R 19/38
[52] U.S. Cl. ........................... 293/118; 293/117; 292/35; 292/36
[58] Field of Search ..................... 293/117, 116, 293/118, 106; 292/35, 36, 158, DIG. 29; D12/167, 163, 169, 172; 296/62; 280/166

[56] References Cited

U.S. PATENT DOCUMENTS

| | | | |
|---|---|---|---|
| 2,672,363 | 3/1954 | Buchanan | 293/118 |
| 3,451,710 | 6/1969 | Savell | 293/73 |
| 3,533,654 | 10/1970 | Kannegieter | 293/117 X |
| 3,580,613 | 5/1971 | Northrop | 293/117 X |
| 3,623,764 | 11/1971 | Jacobus | 280/166 X |
| 3,627,350 | 12/1971 | Cross | 280/166 |
| 3,834,490 | 9/1974 | Ford | 182/88 |
| 4,194,754 | 3/1980 | Hightower | 280/166 |
| 4,198,070 | 4/1980 | Weiler | 280/166 |
| 4,901,895 | 2/1990 | Gancarz | 224/42.03 A |

FOREIGN PATENT DOCUMENTS 58-89418  5/1983  Japan.

OTHER PUBLICATIONS

Circle Ward's Info No. 138 "Cycoloy Polymer Sells Cars" Oct. 1994.

*Primary Examiner*—David M. Mitchell
*Assistant Examiner*—Kia M. Robinson
*Attorney, Agent, or Firm*—David B. Kelley

[57] ABSTRACT

An automotive vehicle with a vehicle body surrounding a storage area and a storage surface has a bumper with a concealable step side and a fascia side. The bumper is mounted to the vehicle for movement between a fascia position and a step position. In the fascia position, the fascia side is substantially vertical and rearwardly facing, and the step side is substantially concealed from view with respect to the vehicle body. In the step position, the step side is presented substantially horizontal and vertically below the storage area surface to permit step access to the storage surface. The bumper is releasably latched to the vehicle when in the fascia position.

12 Claims, 4 Drawing Sheets

CONCEALABLE VEHICLE BUMPER STEP

FIELD OF THE INVENTION

The present invention relates generally to automotive vehicle bumper assemblies, and, more particularly, to bumper assemblies providing a step to a vehicle access or storage area.

BACKGROUND OF THE INVENTION

It is known to provide a horizontal surface on a fixed bumper in the rear of a vehicle to provide step access to a storage area. For example, as seen in FIG. 1, a pick-up truck 100 has a transversely extending bumper 102 fixed to the truck frame (not shown) below a tailgate 104. A relatively flat upper surface 106 of the bumper 102 provides a step for access to the cargo bed 108 of the truck 100. Because the flat upper surface is exposed to the environment, dirt and other debris may collect hereon requiring a clearing effort before stepping thereupon. Such a bumper may also pose an inconvenience as a result of being too high. Moreover, such a bumper arrangement disrupts body surface-to-bumper contour and to some extent is unpleasing in appearance.

To remedy the height problem posed by conventional step bumpers, foldable steps have been proposed which fold down from the step area to a lower level, such as disclosed in U.S. Pat. No. 3,627,350 (Cross), U.S. Pat. No. 4,194,754 (Hightower), and U.S. Pat. No. 4,198,070 (Weiler). Foldable assemblies attached to a step bumper not only appear bulky, but increase the complexity and cost of the bumper. The foldable bumper step of U.S. Pat. No. 3,834,490 (Ford), while retractable into a housing attached below the bumper and under the vehicle body, does not solve the appearance problem of the step on the bumper, and is expensive to manufacture.

Shiftable and rotatable bumpers are known for allowing ease of access to a cargo space with a surface below the bumper, for example in station wagons, as seen in U.S. Pat. No. 3,451,710 (Savell) and Japanese Pat. No. 89,418. A rotatable bumper is also shown in U.S. Pat. No. 4,901,895 (Gangarz) which has a storage compartment for sheet material dispensing. None of these disclosures addresses a lowerable step.

SUMMARY OF THE INVENTION

In response to the above noted problems in the related art, the present invention provides a vehicle bumper with a concealable step side and a fascia side. The bumper is mounted to the vehicle for movement between a fascia position and a step position. In the fascia position, the fascia side is substantially vertical and rearwardly facing so as to present a pleasing appearance, and the step side is substantially concealed from view with respect to the vehicle body. In the step position, the step side is presented substantially horizontal and vertically below a vehicle storage area surface to permit step access to a storage surface. The bumper is releasably latched to the vehicle when in the fascia position.

An advantage of the present invention is a vehicle step bumper in which the step surface can be concealed from view with respect to the vehicle body while a fascia side of the bumper blends with the vehicle body surface to lend an aesthetically pleasing contour to the vehicle rear end.

Another advantage is a vehicle step bumper which can be easily styled by changing the fascia side.

Yet another advantage is a step bumper with a step side having a greater step surface than conventional fixed step bumpers.

Another advantage is a step bumper in which a trailer hitch receiver can be inserted above the bumper when in a step position.

Still another advantage of the present invention is a step bumper which is easily assembled and installed, and inexpensive to manufacture.

Yet still another advantage is a concealable step bumper which can be easily moved to conceal the step side of the bumper.

A feature of the present invention is a step bumper having a fascia side which blends with the vehicle body surface and a concealable step side.

Another feature is a step bumper which is movable between a fascia position in which the fascia side is substantially vertical and rearwardly facing, and the step side is substantially concealed from view with respect to the vehicle body, and a step position in which the step side is presented substantially horizontal and vertically below a storage area surface to permit step access to a storage surface.

Still another feature is a step bumper which is releasably latched to the vehicle when in the fascia position.

BRIEF DESCRIPTION OF THE DRAWINGS

These and other objects, advantages and features of the present invention will be apparent to those skilled in the vehicle bumper arts upon reading the following description with reference to the accompanying drawings, in which.

DETAILED DESCRIPTION OF THE PREFERRED EMBODIMENTS

Figure 1:
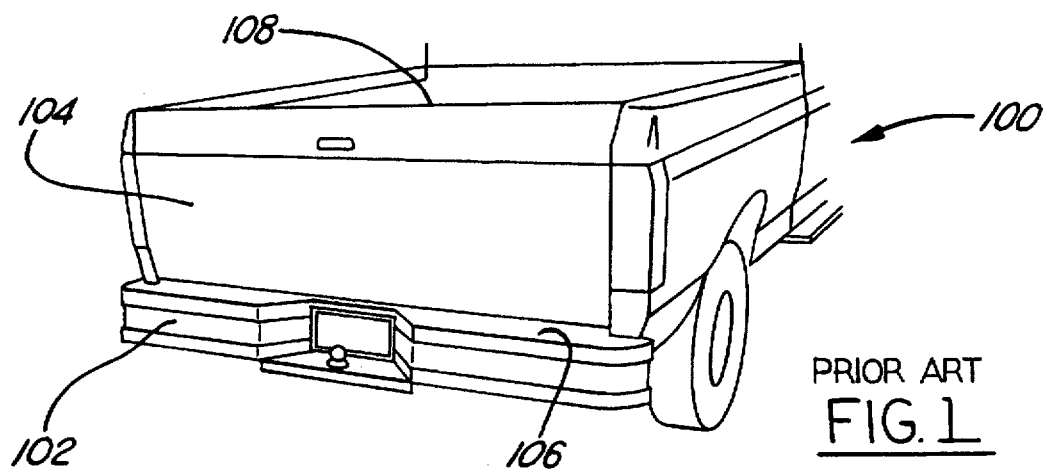
FIG. 1 is a perspective rear view of a vehicle having a prior art step bumper fixed to the vehicle body.
Figure 2:
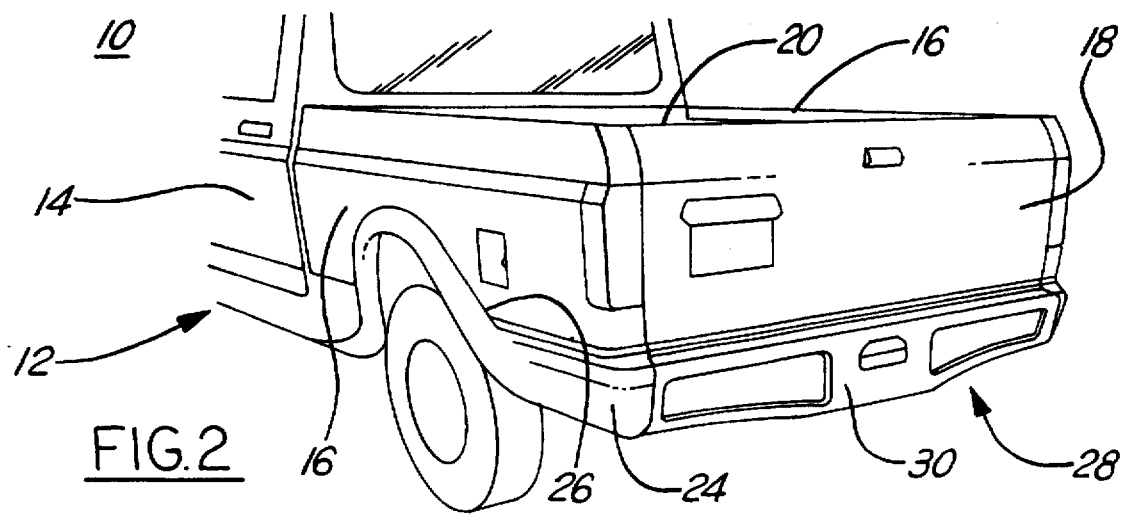
FIG. 2 is a perspective rear view of a vehicle having a concealable bumper step according to a preferred embodiment of the present invention shown in a fascia position.
Figure 9:
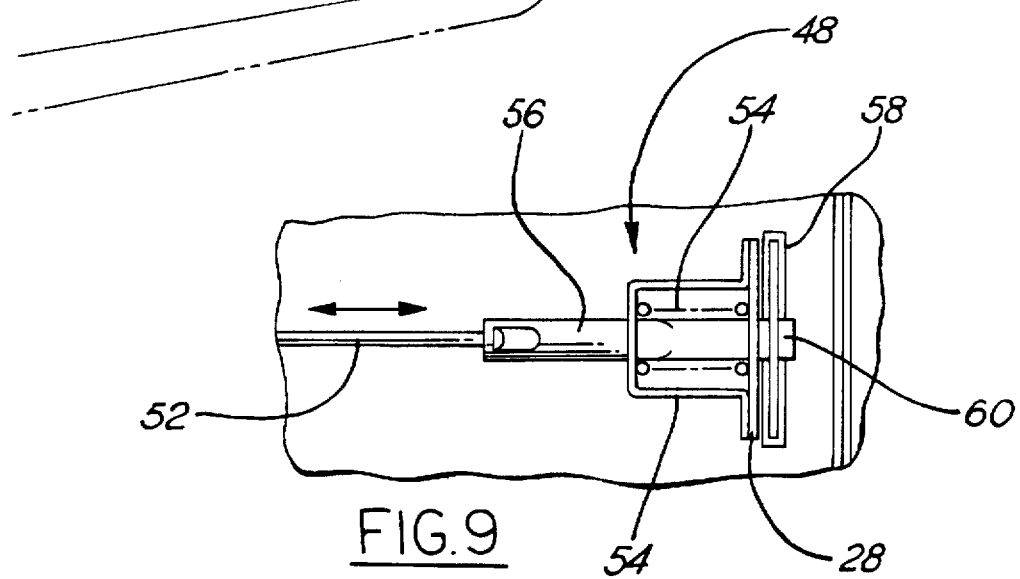
FIG. 9 is a cross-sectional view of the latch mechanism of FIG. 8.

Turning now to FIG. 2 of the drawings, a rear section of an automotive vehicle 10 is shown having a vehicle body 12 partially comprised of a door 14, rear quarter panels 16 and a tail gate 18. Those skilled in the art will recognize that the vehicle body 12 typically has other body panels which may include a roof, a hood, front quarter panels, and a grill (none shown). In the vehicle 10 of FIG. 2, the rear quarter panel 16 and the tailgate 18 cooperate to form a storage area therebetween, which for a conventional pick-up truck is called a bed 20. The bed 20 has a storage surface 22, as seen in FIG. 9, upon which articles may be placed. The present invention is not intended to be limited to pick-up trucks, however, and those skilled in the art will recognize that other vehicles such as vans, station wagons and similar cargo carrying or passenger vehicles may utilize the present concealed step bumper invention. Vehicle 10 also has trim 24 along a lower edge 26 of the rear quarter panel 16 for body styling and damage protection.

Figure 3:
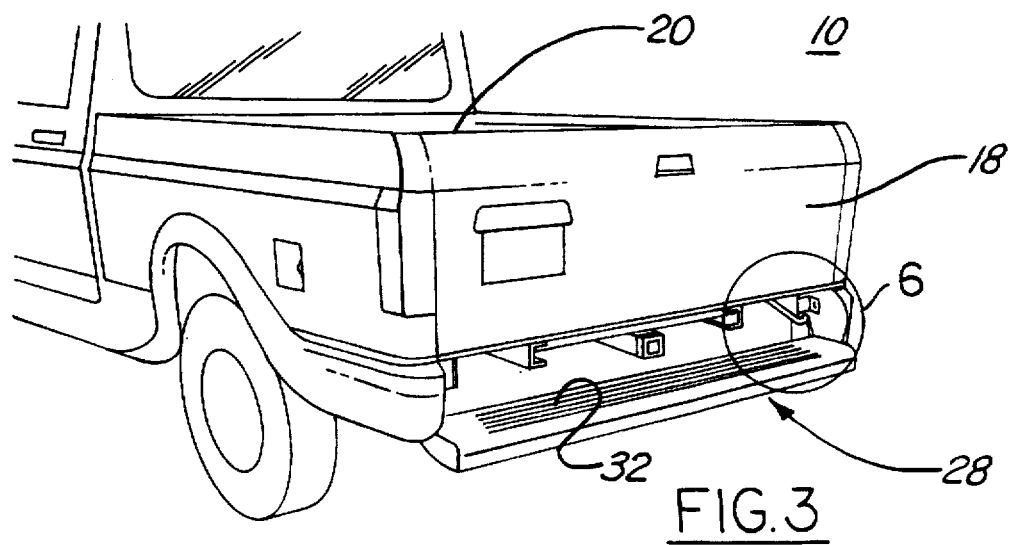
FIG. 3 is a perspective rear view of a vehicle having a cancelable bumper step according to a preferred embodiment of the present invention shown in a step position.

Still referring to FIG. 2, it will be seen that the vehicle 10 has a bumper 26 mounted below the vehicle body 12 and preferably so as to form a continuum with the trim 24. The bumper 28 has a fascia side 30 (FIG. 2) and a step side 32 (FIG. 3), and is moveable between a fascia position (FIG. 2) and a step position (FIG. 3). In the fascia position, the fascia side 30 is substantially vertical, rearwardly facing, and substantially flush with the adjacent body panel, which in FIG. 2 is the tail gate 18, so as to present a generally smooth transition between the bumper 28 and the vehicle body 12. The step side 32 is concealed from view, with respect to an observer viewing the exterior of the vehicle body 12, when the bumper 28 is in the fascia position (FIG. 2).

Figure 4:
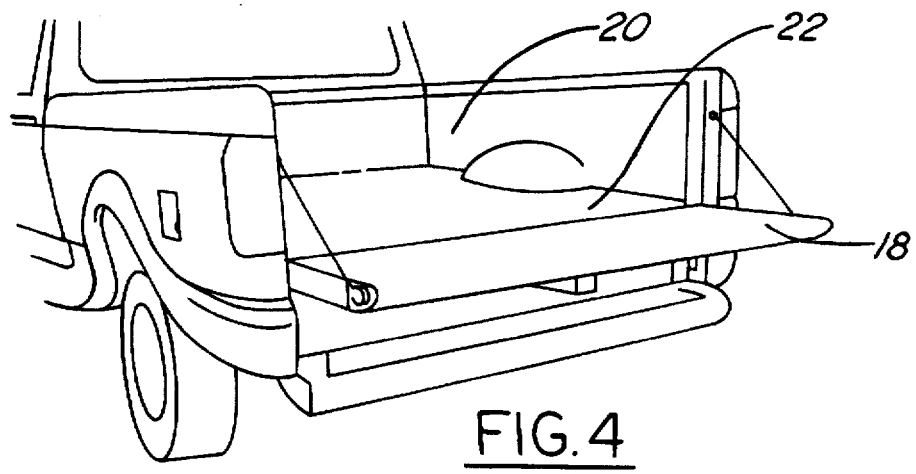
FIG. 4 is a rear perspective view of a vehicle showing a tailgate in a lowered position with a step bumper according to the present invention in a step position.

In the step position, the bumper 28 is moved so that the step side 32 is presented substantially horizontal to and vertically below a storage surface 22 (FIGS. 3 and 4). Such an arrangement allows step access to the bed 20 for a pick-up truck, or to a storage area in other cargo carrying vehicles. The bumper 28 may be arranged alternatively so that the step side 32 is vertically even with or above storage surface so as to allow access to the bed 20 when the tailgate 18 is closed (FIG. 3).

Figure 5:
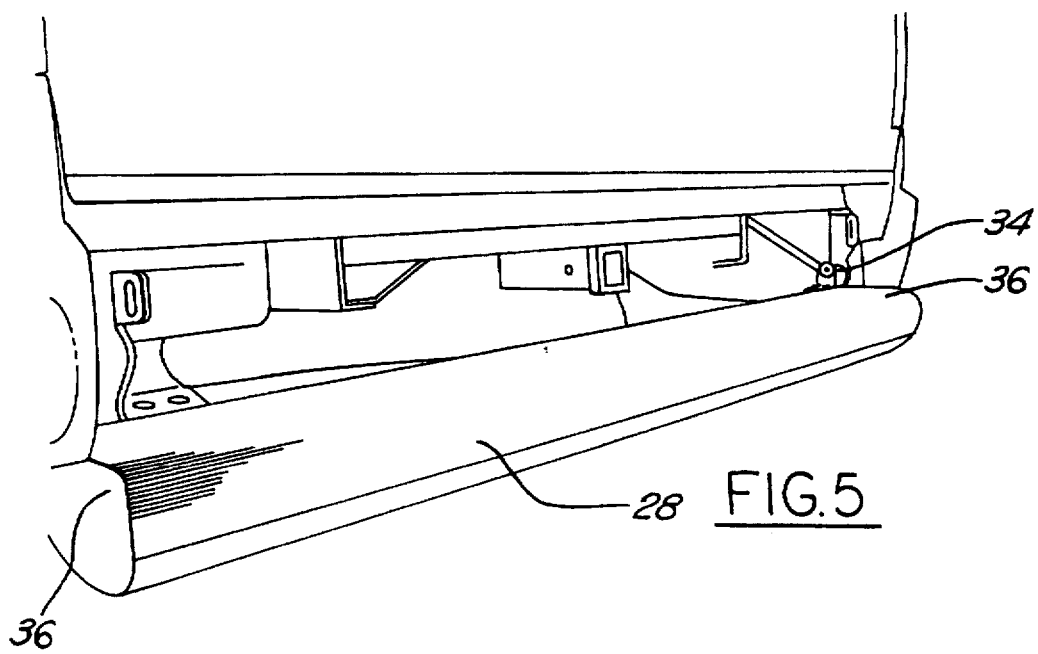
FIG. 5 is a close up perspective view of the concealable step bumper of FIG. 3.
Figure 6:
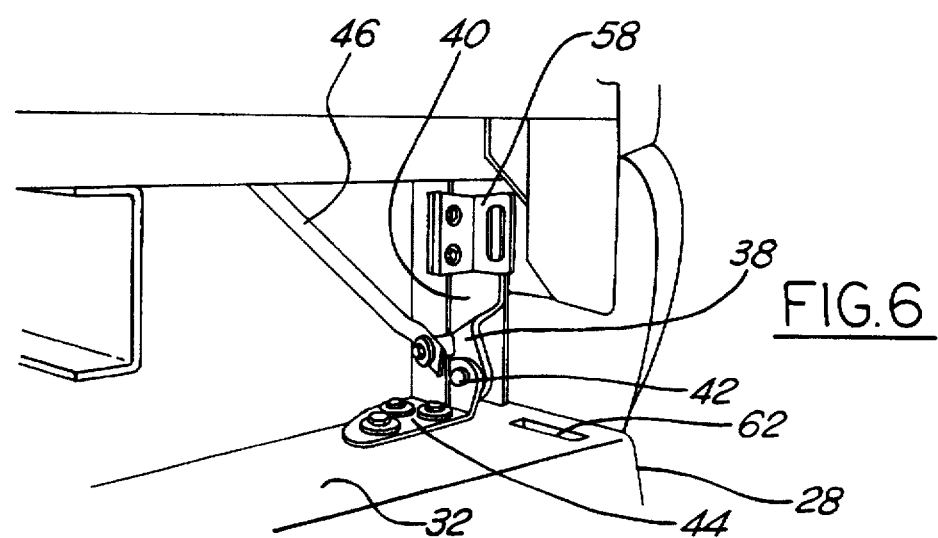
FIG. 6 is a perspective view of a hinge, latch catch, and support bar for a cancelable bumper step according to a preferred embodiment of the present invention.

Turning now to FIGS. 5 and 6, movement of the bumper 28 between the fascia position and the step position is preferably rotatably accomplished with a pair of hinges 34 (only one shown) attached to ends 36 of the bumper 28. The hinges 34 have a frame bracket 38 attached to the vehicle frame 40 connected by a hinge pin 42 to a bumper bracket 44 in a known fashion. A reinforcement rod 46 attached between the vehicle frame 40 and the frame 38. Alternatively, the bumper 28 may be mounted on a track so as to slide along the vehicle longitudinal axis between the fascia and step positions.

Figure 7:
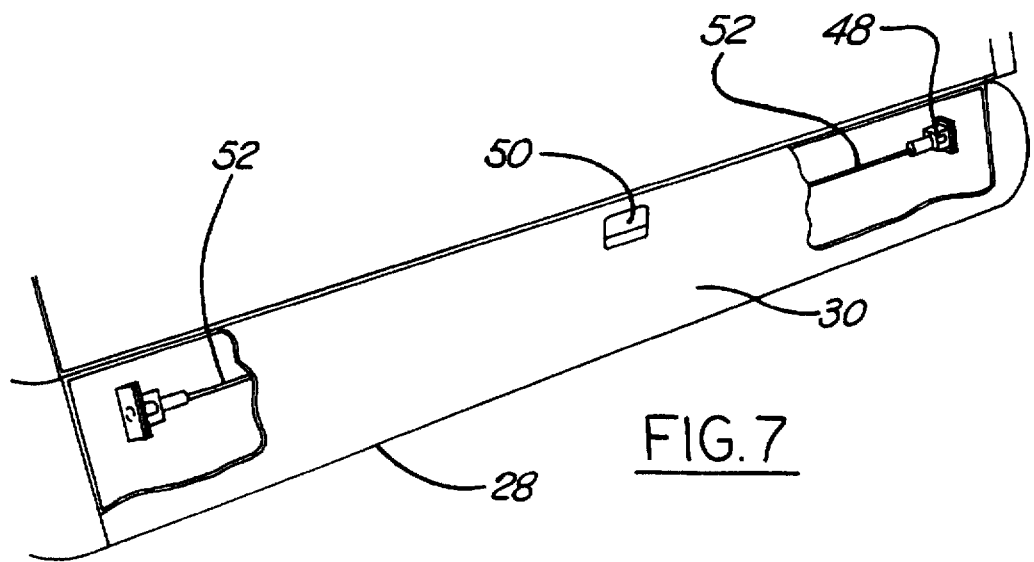
FIG. 7 is a partially cut-away, rear view of a concealable bumper step according to the present invention showing a latching mechanism.
Figure 8:
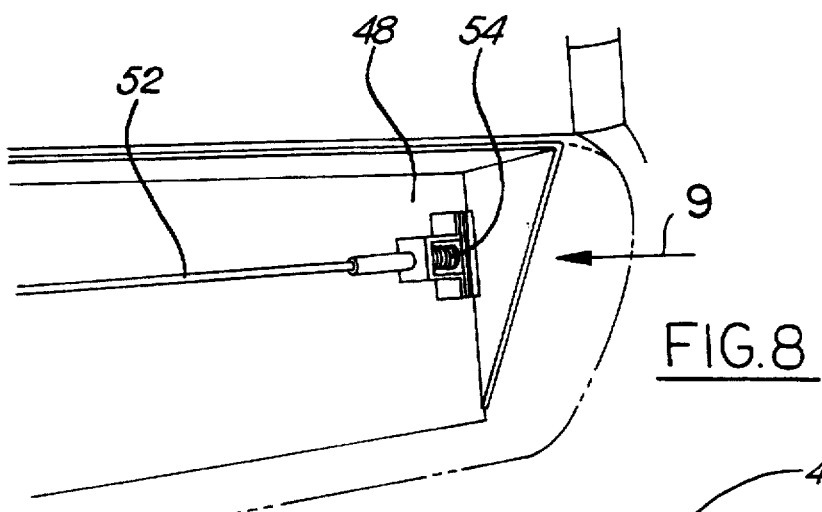
FIG. 8 is a perspective view of the latch mechanism of FIG. 7.

Preferably, the bumper 28 is latched to the vehicle frame 40 when in the fascia position. To this end, bumper 28 is provided with a latch mechanism 48 as seen in FIGS. 7–9. Beginning with FIG. 7, the fascia side 30 of bumper 28 is provided with a handle 50 connected to transversely extending latch rods 52. Handle 50 operates in conventional fashion and the operation of such handles is well-known in the automotive door latching arts. Each latch rod 52 is connected to a latch pin 56 which is mounted in a housing 57 within the bumper 28 (FIGS. 8–9). The spring 54 is attached to the latch pin 56 and biases it through a catch 58 mounted on the vehicle frame 40 (FIGS. 6 and 9). When the handle 50 is pulled outwardly away from the bumper 28, the latch rods 52 are drawn toward the handle 50 against the force of the spring 54. The latch pin 56 thus disengages from the catch 58 allowing the bumper 28 to move relative to the vehicle body 12 to the step position. Although not shown, the latch pin 56 may be beveled on one side of the end 60 to facilitate relatching of the bumper 28 to the vehicle frame 40 in fascia position.

As seen in FIG. 6, a slot 62 on the step side receives the catch 58 when the bumper 28 is in the fascia position.

Figure 10:
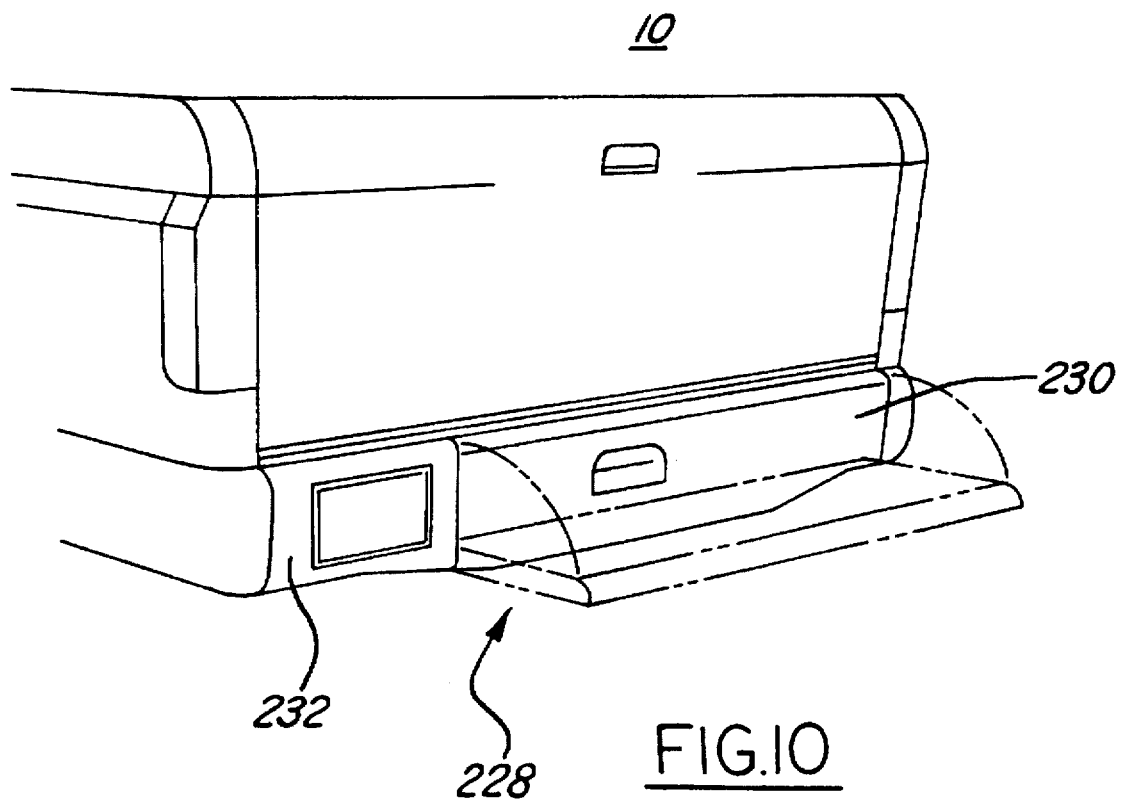
FIG. 10 is a rear perspective view of an alternative embodiment of a concealable step bumper according to a preferred embodiment of the present invention.

In an alternative embodiment shown in FIG. 10, a bumper 228 is bisected into a moveable portion 230 and a fixed portion 232. Operation of the moveable portion 230 is similar to that described above with respect to bumper 28, except that in a step position, the moveable portion provides a step for only a limited width of the vehicle 10. This embodiment permits a license plate holder 240 to be placed at the bumper level.

Those skilled in the art will understand that the present invention is not limited to the hinge and latching mechanisms described and shown, but that other such mechanisms may be used to provide a concealable bumper step. In addition, the handle need not be placed at the center of the bumper 28, but could be placed on either end thereof or on an adjoining quarter panel.

Although the preferred embodiments of the present invention have been disclosed, various changes and modifications may be made without departing from the scope of the invention as set forth in the appended claims.

I claim:

1. In an automotive vehicle having a vehicle body and a rear quarter panel trim surrounding a storage area having a storage surface therein, a bumper assembly comprising:

a bumper member having a step side and a fascia side, the bumper member mounted to the vehicle on said step side for movement between a fascia position in which the fascia side is substantially vertical and rearwardly facing and substantially flush with the vehicle body, forming a continuous surface with the rear quarter panel trim, and the step side is substantially concealed from view with respect to the vehicle body, and a step position in which the step side is presented substantially horizontal and vertically below the storage surface to permit step access thereto; and means for releasably latching the bumper member to the vehicle when the bumper member is in the fascia position.

2. A bumper assembly according to claim 1 wherein the bumper member is attached to the vehicle by a hinge.

3. A bumper assembly according to claim 1 wherein the means for releasably latching comprises a latch assembly and a handle on the bumper member for operating the latch assembly between a locked position in which the bumper member is latched in the fascia position to the vehicle and an unlocked position in which the bumper member is unlatched from the vehicle.

4. A bumper assembly according to claim 3 wherein the latch assembly comprises:

at least one latch rod connected on a first end to the handle;

at least one latch pin connected to a second end of the at least one latch rod;

a catch on the vehicle having a slot for receiving the at least one latch pin; and a spring attached to the at least on latch pin for biasing the at least one latch pin into the catch.

5. In an automotive vehicle having a vehicle body and a rear quarter panel trim surrounding a storage area having a storage surface therein, a bumper assembly comprising:

a bumper member mounted to the vehicle and having a fixed portion and a movable portion, the movable portion having a fascia side and a step side, and movable between a fascia position in which the fascia side is substantially vertical and rearwardly facing and substantially flush with the vehicle body, forming a continuous surface with the rear quarter panel trim, and a step position in which the step side mounted directly to the vehicle and is presented substantially horizontal to and vertically below the storage surface to provide step access thereto;

latch means for latching the movable portion to the vehicle; and a handle for operating the latch means between a locked position in which the movable portion is latched in the fascia position to the vehicle and an unlocked position in which the movable portion is unlatched from the vehicle.

6. A bumper assembly according to claim 5 wherein the handle is located on the movable portion.

7. A bumper assembly according to claim 5 wherein the movable portion is attached to the vehicle by a hinge.

8. A bumper assembly according to claim 5 wherein the latch means comprises:

at least one latch rod connected on a first end to the handle;

at least one latch pin connected to a second end of the at least one latch rod;

a catch on the vehicle having a slot for receiving the at least one latch pin; and a spring attached to the at least one latch pin for biasing the at least one latch pin into the catch.

9. In an automotive vehicle having a vehicle body mounted to a vehicle frame, the vehicle body having a rear quarter panel trim and surrounding a storage area having a storage surface therein, a bumper assembly comprising:

a bumper member having a step side and a fascia side, the bumper member hingedly mounted to the vehicle on said step side for movement between a fascia position in which the fascia side and the step side are substantially vertical, the fascia side is rearwardly facing, and the step side is substantially concealed from view with respect to the vehicle body, and a step position in which the step side is presented substantially horizontal and vertically below the storage surface to permit step access thereto;

a latch mechanism in the bumper member for releasably latching the bumper member to the vehicle;

a handle on the bumper member for operating the latch mechanism between a locked position in which the bumper member is latched in the fascia position and an unlocked position in which the bumper member is unlatched from the vehicle; and support means for stabilizing the bumper member with respect to the vehicle.

10. A bumper assembly according to claim 9 wherein the support means comprises a reinforcement rod connected between the vehicle frame and the bumper member.

11. A bumper assembly according to claim 9 wherein the latch mechanism comprises:

at least one latch rod connected on a first end to the handle;

at least one latch pin connected to a second end of the at least one latch rod;

a catch on the vehicle having a slot for receiving the at least one latch pin; and a spring attached to the at least on latch pin for biasing the at least one latch pin into the catch.

12. A bumper assembly according to claim 9 wherein the fascia side is substantially flush with the vehicle body and forms a continuous surface with the rear quarter panel trim.

* * * * *